United States Patent
Yang et al.

(10) Patent No.: US 11,892,046 B2
(45) Date of Patent: Feb. 6, 2024

(54) INTERNAL DRUM BRAKE ANTI-FALLING DEVICE

(71) Applicant: BEXUS INDUSTRIES CO., LTD., Taichung (TW)

(72) Inventors: Kai Chieh Yang, Taichung (TW); Chia Cheng Huang, Taichung (TW)

(73) Assignee: BEXUS INDUSTRIES CO., LTD., Taichung (TW)

( * ) Notice: Subject to any disclaimer, the term of this patent is extended or adjusted under 35 U.S.C. 154(b) by 191 days.

(21) Appl. No.: 17/398,011

(22) Filed: Aug. 10, 2021

(65) Prior Publication Data
US 2022/0373049 A1   Nov. 24, 2022

(30) Foreign Application Priority Data
May 21, 2021  (TW) .................................. 110118434

(51) Int. Cl.
F16D 65/54 (2006.01)
F16D 65/22 (2006.01)
(Continued)

(52) U.S. Cl.
CPC .............. F16D 65/546 (2013.01); A62B 1/10 (2013.01); A62B 35/0093 (2013.01); F16D 51/04 (2013.01); F16D 65/22 (2013.01)

(58) Field of Classification Search
CPC ........ F16D 65/22; F16D 65/546; F16D 65/74; F16D 2125/30; F16D 51/00; F16D 51/22;
(Continued)

(56) References Cited

U.S. PATENT DOCUMENTS 5,415,256 A * 5/1995 Weigand ................. F16D 65/12
  464/30
5,447,280 A * 9/1995 Feathers .................. A62B 1/10
  242/396.6

(Continued)

*Primary Examiner* — Robert A. Siconolfi
*Assistant Examiner* — Mahbubur Rashid
(74) *Attorney, Agent, or Firm* — Che-Yang Chen; Law Office of Michael Chen (57) ABSTRACT

An internal drum brake anti-falling device includes a carrier having an accommodating chamber and main shaft crossingly arranged in the accommodating chamber for supporting a rotating drum to autorotate, wherein the rotating drum has a life belt coiled thereon, a brake unit arranged at an end thereof, and a drum brake module, which comprises a base, mounted in the accommodating chamber, and a passive ring, mounted on the base. An outer diameter of the base defines a first ring surface configured in a concentric circle manner to the main shaft. An inner diameter of the passive ring defines a second ring surface, wherein an externally toothed ratchet teeth is arranged in a concentric circle manner on the second ring surface to allow the second ring surface and the first ring surface to be disposed opposite to and closely fitting to each other so as to allow the first ring surface and the second ring surface to sequentially generate maximum static friction force and kinetic friction force therebetween when the life belt drives the brake unit buckling with the ratchet teeth, so as to buffer the rotating drum and the life belt.

18 Claims, 6 Drawing Sheets

(51) Int. Cl.
*A62B 35/00* (2006.01)
*F16D 51/04* (2006.01)
*A62B 1/10* (2006.01)

(58) Field of Classification Search
CPC .... F16D 65/561; F16D 2125/62; F16D 51/50;
F16D 65/08; F16D 65/09; F16D 2125/66;
F16D 2125/32; F16D 2125/68; F16D
2127/12; F16D 51/10; F16D 65/10; F16D
2125/34; F16D 2127/06; F16D 2127/10;
F16D 49/00; F16D 51/04; A62B 35/0093
See application file for complete search history.

(56) References Cited

U.S. PATENT DOCUMENTS

| | | | | |
|---|---|---|---|---|
| 5,722,612 | A * | 3/1998 | Feathers | A62B 35/0093 |
| | | | | 242/381.5 |
| 7,281,620 | B2 * | 10/2007 | Wolner | F16D 63/006 |
| | | | | 192/223.1 |
| 7,311,183 | B2 * | 12/2007 | Black, Jr. | F16D 65/42 |
| | | | | 192/111.6 |
| 10,029,128 | B2 * | 7/2018 | Lin | A62B 35/04 |
| 10,653,903 | B2 * | 5/2020 | Jones | A62B 35/0093 |
| 10,661,106 | B2 * | 5/2020 | Choate | A62B 35/0093 |
| 10,792,523 | B2 * | 10/2020 | Casebolt | A62B 35/0093 |
| 2011/0278095 | A1 * | 11/2011 | Hetrich | A62B 1/10 |
| | | | | 182/231 |
| 2011/0315483 | A1 * | 12/2011 | Griffiths | A62B 1/10 |
| | | | | 182/232 |

\* cited by examiner

INTERNAL DRUM BRAKE ANTI-FALLING DEVICE

BACKGROUND OF THE PRESENT INVENTION

Field of Invention

The present invention relates to the field of an internal drum brake anti-falling device that has a better brake and deceleration performance and allows modulized assembling.

Description of Related Arts

A prior art, as illustrated in U.S. Pat. No. 9,861,841 B1, "Fall Protection Device", has a deceleration member capable of auto-rotating around a main shaft, wherein an end of the deceleration member is affixed on a brake unit and the outer circumferential surface thereof utilizes its friction side to bond with an inner toroidal surface of a rotating drum, wherein the external toroidal surface of the rotating drum has a life belt surrounded therearound, wherein the outer end of the life belt is tied to the user, such that when the user falls, the deceleration member is fixed and the rotating drum can rotate relatively to the deceleration member, so that a rotation friction force is generated between the friction side and the inner toroidal surface, so as to slow down the rotating speed of the rotating drum, and to buffer the falling speed of the life belt.

When the life belt drives the rotating drum to rotate relatively to the deceleration member, the actuating arm formed by the life belt is much larger than the resistant arm formed by the deceleration member, and under the synergistic action of gravity acceleration of the user falling, the friction surface can wear and fail even after the drum has gone for less than two circles, rendering the deceleration member failing to slow down the subsequent rotation of the rotating drum. Accordingly, the prior case certainly has a problem of short durability buffering performance. Furthermore, the prior case has a disadvantage of difficult to maintain because the replacements of the main shaft, the deceleration member, and the rotating drum are not only costly, but also time-consuming and labor-consuming in disassembling and reassembling the frame and the brake unit.

SUMMARY OF THE PRESENT INVENTION

The present invention provides a main shaft arranged across an accommodating chamber of a carrier, a rotating drum capable of auto-rotating around the main shaft, a safety belt coiled around the rotating drum, a brake unit arranged at an end of the rotating drum, and a drum brake module mounted thereon; the drum brake module is constructed with a base mounted in the accommodating chamber and a passive ring mounted on the base. The outer diameter of the base define a first ring surface configured in a concentric circle manner to the main shaft. The inner diameter of the passive ring defines a second ring surface, wherein an externally toothed ratchet teeth is arranged in a concentric circle manner on the second ring surface to allow the second ring surface and the first ring surface opposite to and closely fitting to each other, so as to control the first ring surface and the second ring surface to sequentially generate a maximum static friction and kinetic friction force therebetween when the life belt drives the brake unit buckling with the ratchet teeth to interact with the auto-rotation of the passive ring, thereby decelerating the auto-rotation of the passive ring, thereby buffering the rotating drum and the life belt, and effectively improving the plurality of drawbacks of U.S. Ser. No. 09/861,841B1.

The present invention also provides that: the first ring surface and the second ring surface are controlled to maintain a circle-shaped gap therebetween, wherein the gap has a brake lining tightly matched therein, wherein the brake lining is affixed on either the first ring surface or the second ring surface for decelerating the auto-rotation of the passive ring. By means of the addition of the brake lining, it is capable of achieve the double buffering effect of maximum static friction force and kinetic friction force in order relatively easily.

DETAILED DESCRIPTION OF THE PREFERRED EMBODIMENT

Referring to FIGS. 1-6, the present invention provides an internal drum brake anti-falling device which comprises a carrier 10, a main shaft 20, a drum 30, a brake unit 50, a turbination spring 60, and a drum brake module 70.

Figure 1:
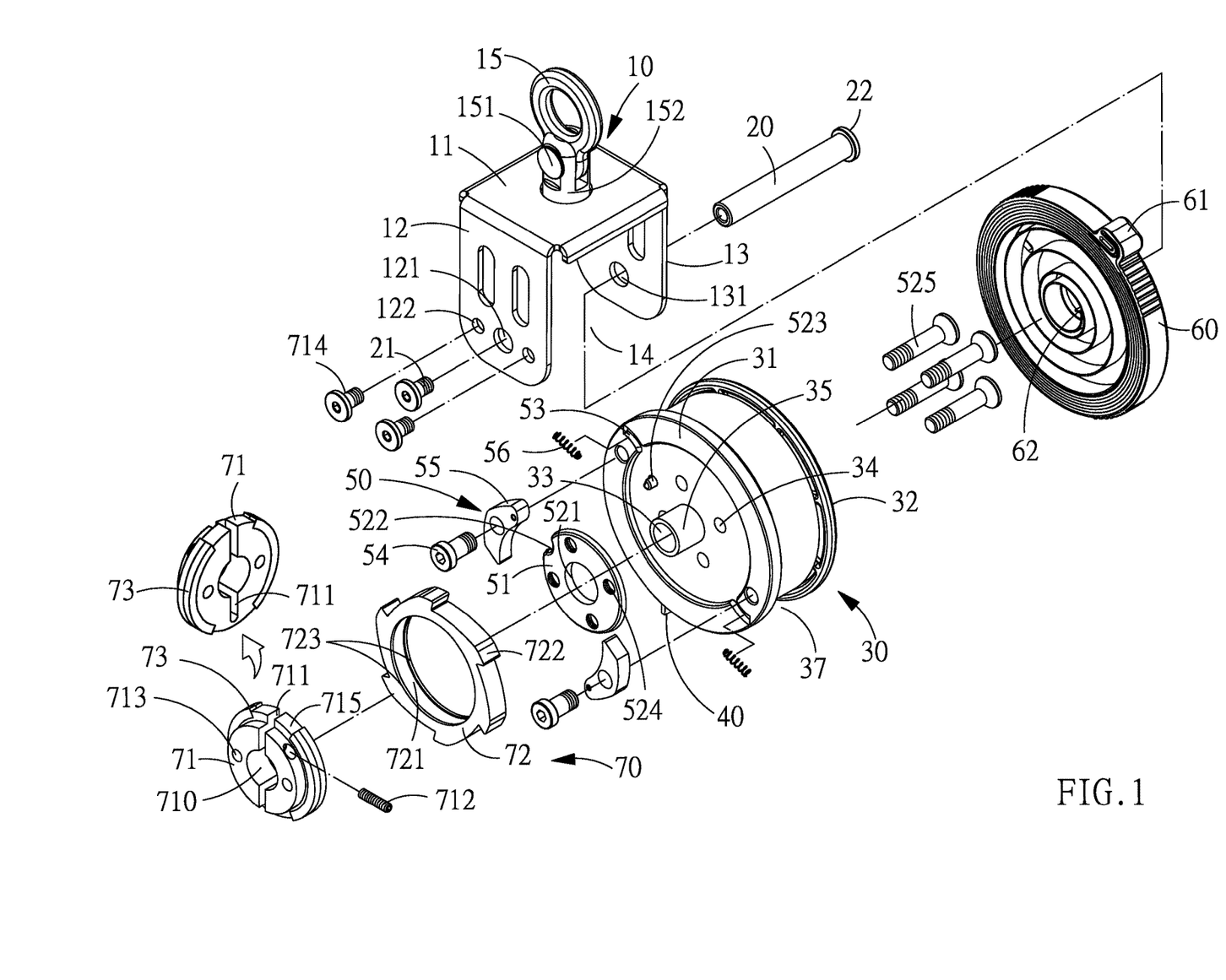
FIG. 1 is an exploded view of the present invention.

The carrier 10 comprises a left plate 12 and a right plate 13 symmetrically extending downwardly from a transverse plate 11 so as to define a chamber 14 thereamong, and a hoisting ring 15 is mounted on top of the transverse plate 11, wherein a bottom of the hoisting ring 15 is pivotally mounted to a top of a longitudinal axle 152 through a transverse pin 151, a bottom of the longitudinal axle 152 is rotatably mounted on the transverse plate 11, and after the hoisting ring 15 is affixed to an upper air anchor point, the carrier 10 can adjust an angle in accordance to the movement of the user. The left plate 12 has a first hole 121 arranged thereon and communicated with the inside and the outside of the accommodating chamber 14, two second holes 122 symmetrically penetratingly provided thereon at the positions surrounding to the first hole 121 as the circle center, and a third hole 131 matched with the first hole 121, penetratingly provided on the right plate 13.

The main shaft 20 is mounted on the carrier 10, to bridge the first hole 121 and the third hole 131 and cross the chamber 14, wherein an end of the main shaft 20 has a buckle member 21 provided thereon in an outer side of the left plate 12 for stopping, while another end has a head 22 protrudingly provided thereon in the outer side of the right plate 13 for stopping, so that the main shaft 20 is detachably mounted on the carrier 10.

The drum 30 has a left end 31 and a right end 32 opposite to each other, and an axle hole 33 penetratingly provided at a circle center position for the main shaft 20 to pass through for pivotally arranged the drum 30 in the chamber 14. Besides, the rotating drum 30 further has a plurality of lockholes 34 penetratingly provided therein parallel to the axle hole 33. The left end 31 and the right end 32 are axially protruded along the periphery of the axle hole 31 to form an annular protruding lip 35, as illustrated in FIG. 3, wherein the annular protruding lip 35 of the right end 32 has an assembling groove 36 provided in a radial manner so as for an inner end 62 of a turbination spring 60 to be mentioned later to be affixed thereon; the outer peripheral ring of the rotating drum 30 has a spacing area 37 so as for an end of the life belt 40 to be affixed and coiled therearound, and the other end of the life belt 40 to protrude from the accommodating chamber 14, so as to be tied to the user's safety cloth, so that when the user moves and pulls the life belt 40, the drum 30 can rotate around the main shaft 20 in response.

Figure 5:
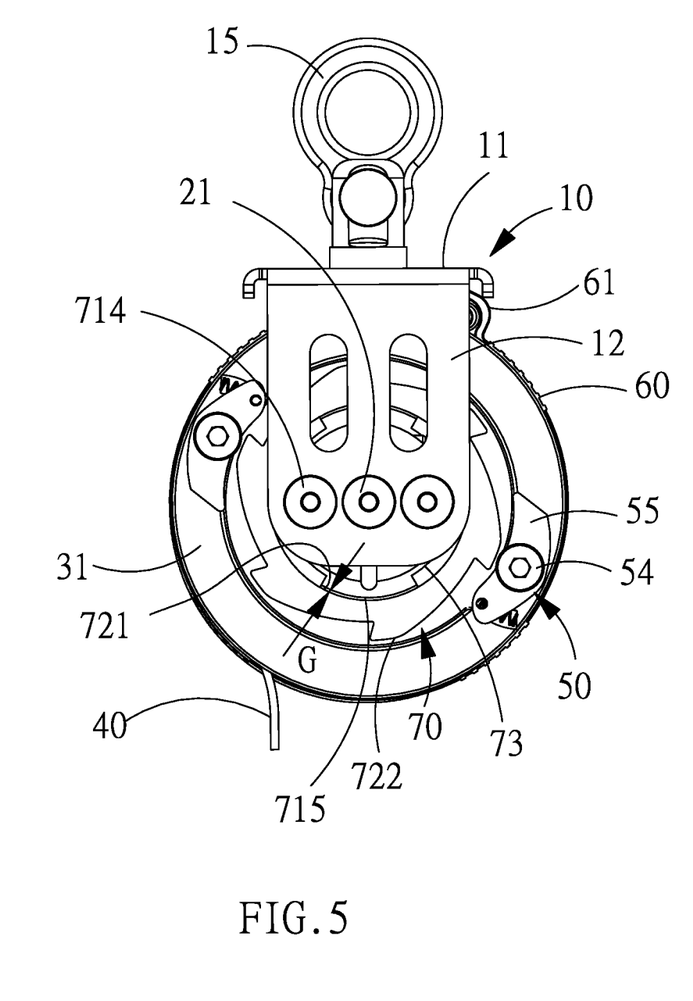
FIG. 5 is a left view of FIG. 4.
Figure 6:
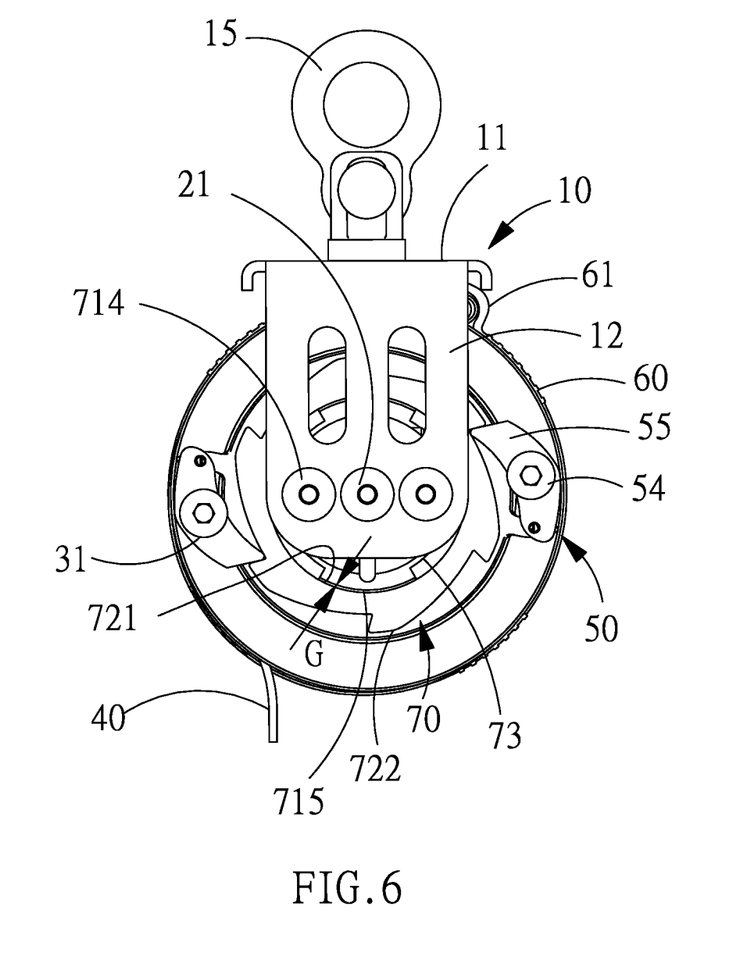
FIG. 6 is a perspective view of the brake unit and the drum brake module of FIG. 4 in a brake mode.

The brake unit 50 comprises an abuttal 51 mounted on the left end 31 of the rotating drum 30, wherein a center of the abuttal 51 has a fourth hole 521 arranged thereon for allowing the annular protruding lip 35 to be inserted therein, wherein a fifth hole 522 eccentrically arranged thereon, allowing a latch 523 to be inserted therein aiming the left end 31 of the rotating drum 30, wherein a screw hole 524 is arranged thereon at the position corresponding to the lock hole 34 to allow the lock bolt 525 to screw lock the abuttal 51 to the left end 31 of the rotating drum 30, so that the abuttal 51 and the left end 31 can be dismountably mounted on the rotating drum 30 and capable of integrally linking with and moving with the rotating drum 30. Two axle seats 54 and two spring seats 53 are symmetrically arranged on the periphery of the left end 31 of the rotating drum 30 respectively, a centrifugal block 55 pivotally connected with the axle seat 54, and a back spring 56 mounted between the centrifugal block 55 and the spring seat 53, as illustrated in FIG. 5, so that the back spring 56 provides a constant outward positioning tendency for the centrifugal block 55, but when the life belt 40 is rotated to a certain speed due to the drive of the falling of the user, it renders the centrifugal block 55, as illustrated in FIG. 6, to overcome the back spring 56 to retract and buckle with the ratchet teeth 722 to be mentioned later.

Figure 2:
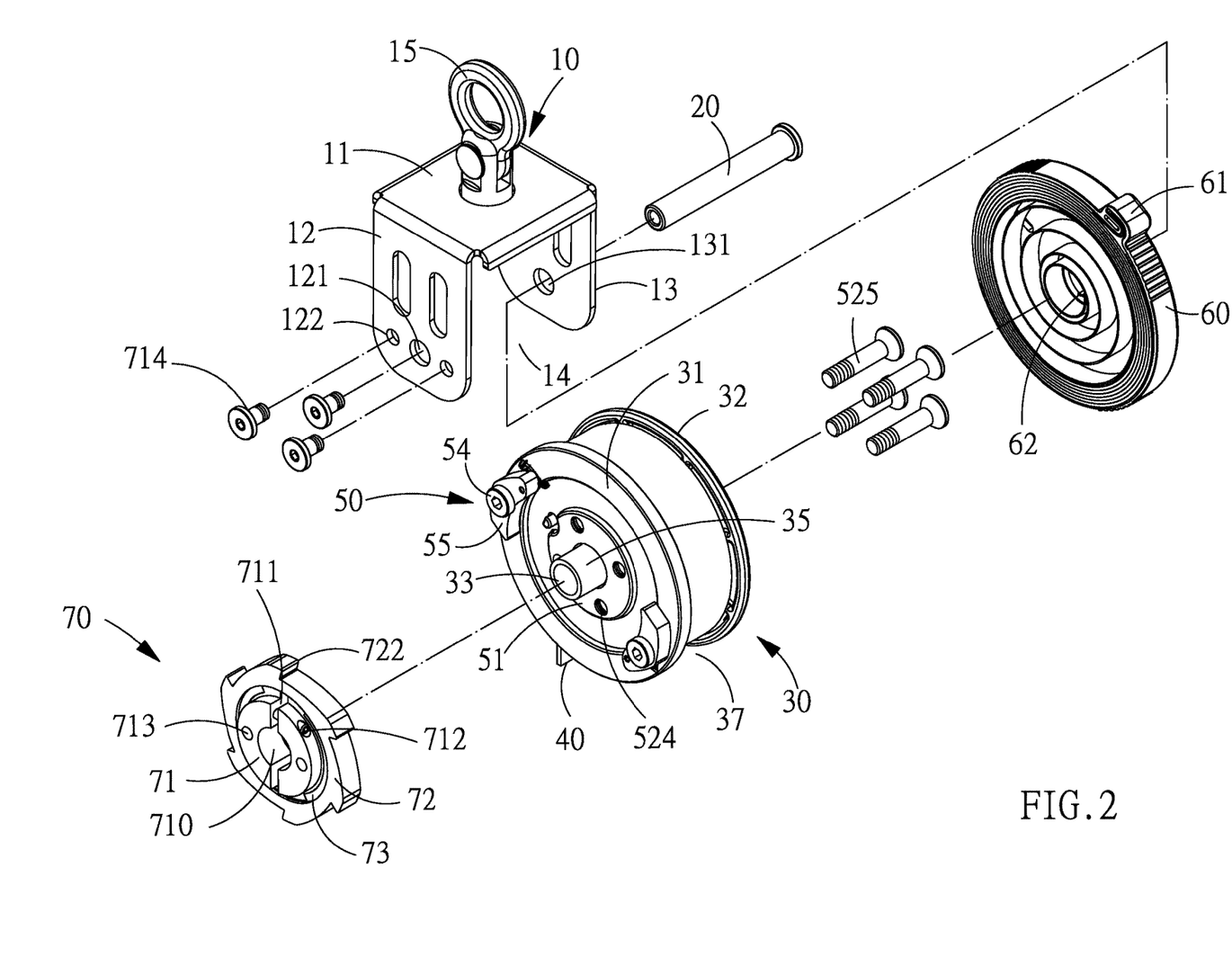
FIG. 2 is a partially assembling view of a brake unit and a drum brake module of FIG. 1
Figure 3:
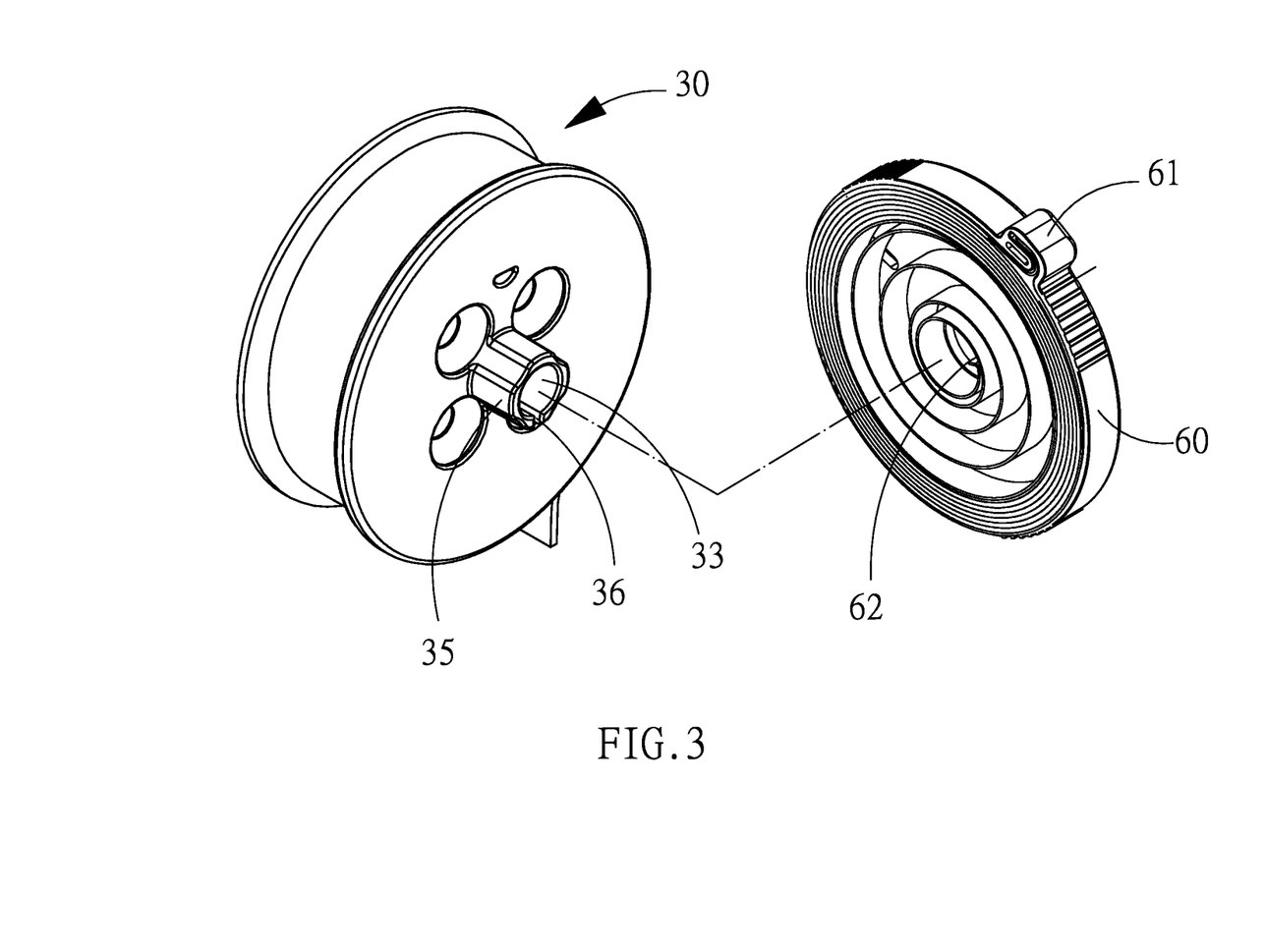
FIG. 3 is an assembling view of a rotating drum and a turbination spring.
Figure 4:
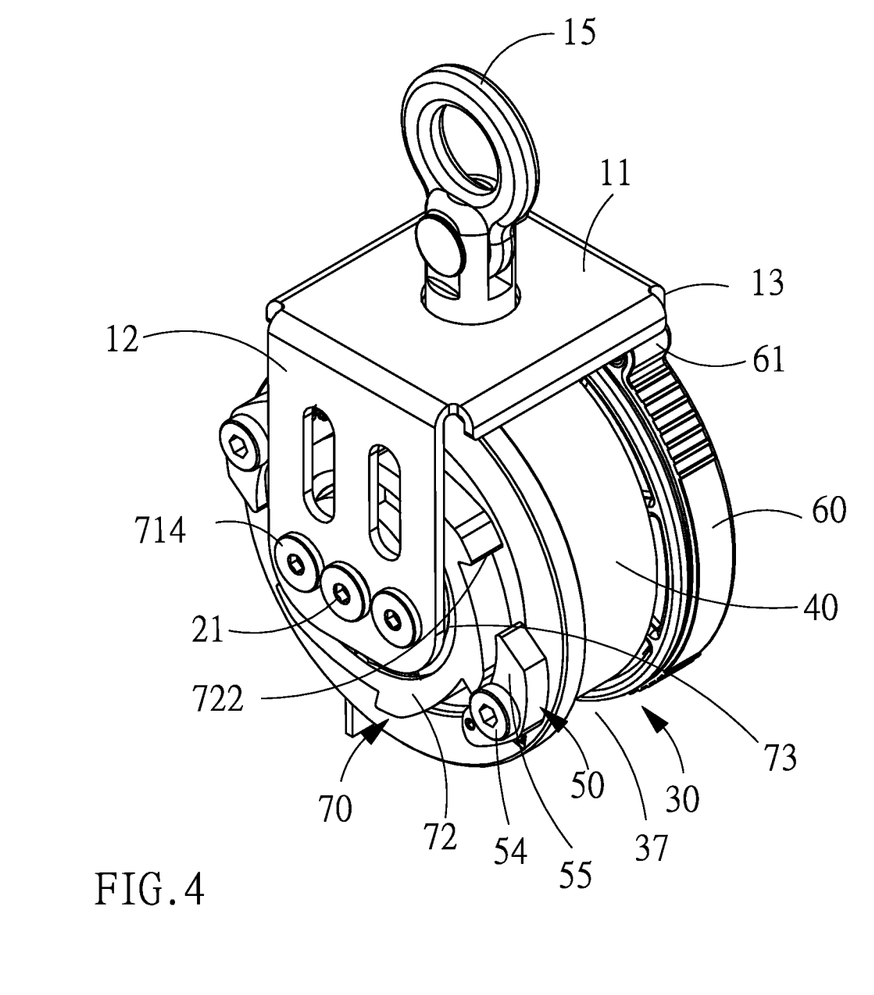
FIG. 4 is an assembling view of FIG. 1.

The turbination spring 60, referring to FIGS. 1 to 3, is mounted on the right end 32 of the rotating drum 30, wherein the turbination spring 60 has an outer end 61 positioned at the transverse plate 11 and an inner end 62 affixed in the assembling groove 36 of the rotating drum 30 for constantly providing a rollback force to the rotating drum 30 for positioning, so as to prevent the life belt 40 from randomly moving out when the user is walking, wherein the life belt 40 can gradually overcome the turbination spring 60 to allow the rotating drum 30 and the brake unit 50 to synchronously auto-rotate around the main shaft 20 in responding to the life belt 40 being slowing pulled out.

The drum brake module 70 comprises a base 71 mounted in the chamber 14, a passive ring 72 arranged in a concentric circle manner with the main shaft 20, and a brake lining 73 for mounting the passive ring 72 onto the base 71. The base 71 has a through hole 710 axially penetratingly arranged thereon a slit 711 radially communicating the inside and outside of the through hole 710, wherein at least a check bolt 712 adapted for crossing the slit 711, and a sixth hole 713 arranged thereon matching with the second hole 122, wherein a screw 714 passes through the second hole 122 to be locked on the sixth hole 713, so as to detachably mount the base 71 to the chamber 14, wherein a wall surface of the through hole 710 is defined as a first ring surface 715, wherein the first ring surface 715 is controlled to be arranged in a concentric circle manner with the main shaft 20, so as to allow the check bolt 712 to rotate to adjust the width of the slit 711 so as to adjust a diameter of the first ring surface 715 in order for adjusting a fitting degree of the gap G to the brake lining 73. An inner diameter of the passive ring 72 is defined as a second ring surface 721 that matches the first ring surface 715 in a manner of controlling a circle-like gap G formed and kept between the first ring surface 715 and the second ring surface 721 for two brake linings 73 to be closely fit therein. The check bolt 712 is adapted to adjust the precompression of the fitting of the brake lining 73, so that the first ring surface 715 and the second ring surface 721 can be relatively tightly matched, so as to mount the passive ring 72 on the base 71 in a concentric circular bonding manner, wherein a part of the brake lining 73 is pre-embedded and affixed in a groove preset on the first ring surface 715' in an integral manner through adhering or other means, wherein the second ring surface 721 further provides an annular retaining 723 with shrank bore diameter on the two ends thereof respectively, so as to restrict the second ring surface 721 from escaping from the first ring surface 715 in order to prevent the passive ring 72 from escaping from the base 71 during the auto-rotation thereof. The passive ring 72 further comprises externally toothed ratchet teeth 722 on an outer diameter thereof in a concentric circle manner with the second ring surface 721. The ratchet teeth 722 match the brake unit 50, so that when the user falls, as illustrated in FIG. 6, the life belt 40 drives the rotating drum 30 and the brake unit 50 to rotate to a certain speed, rendering the centrifugal block 55 of the brake unit 50 to buckle with the ratchet teeth 722 in an inward manner, so as to act on the autorotation of the passive ring 72 and control the maximum static friction force to reduce the torque borne by the passive ring 72 to provide a first buffering effect, wherein the auto-rotation of the passive ring 72 also generates kinetic friction force between the brake lining 73 and the first ring surface 715, thereby effectively decelerating the auto-rotations of the passive ring 72 and the rotating drum 30 so as to continuously buffer the falling speed of the life belt 40 to provide a second buffering effect. These sequentially generated maximum static friction force and kinetic friction force certainly improve in preventing the user from having muscle strain and tearing due to great reacting force of the life belt 40 when s/he falls.

Based on the above illustration, it is clear that the non-obvious improvement of the present invention comprises the following:

First, the base 71 of the present invention is mounted in the accommodating chamber 14 of the carrier 10, which may easily control the diameter of the first ring surface 715 be larger than the bore diameter of the axle hole 33 (equivalent to the inner toroidal surface of the prior case) of the rotating drum 30, so that the total circular friction area and the brake resistant arm formed through the radius of the first ring surface 715 can be larger relatively to it of U.S. patent Ser. No. 09/861,841 B1. Therefore, when absorbing the torque of the falling of the user, the present invention is capable of bearing wider range of torque stably than it of U.S. patent Ser. No. 09/861,841 B1.

Second, The base 71 and the passive ring 72 of the present invention are disposed opposite to and closely fitting to each other, so that the maximum static friction force therebetween may be adjusted through setting the fitting degree and friction coefficient, that it can then be assembled to the carrier 10, so that maintaining or replacing the drum brake module 70 do not require disassembling of the brake unit 50. Instead, only requires disassembling of the main shaft 20, the drum 30, and the turbination spring 60, so as to easily implement the replacement. Therefore, the assembly and the maintenance of the present invention are easier. Besides, the production cost of the modulized configuration of the base 71 and the passive ring 72 are relatively economical.

Third, the present invention allows the check bolt 712 to be adjusted through a torque wrench so as to tighten it for higher stress, which allows the maximum static friction force to be elastically adjusted, which grant the present invention a characteristic of customization, so as for responding to the body weight of different users. On the other hand, the adjustment of the prior technology, U.S. Ser. No. 09/861,841B1, is very difficult, which characteristic of customization and overall safety are both far weaker than the present invention.

Fourth, the present invention may effectively reduce the brake lining 73, and then directly control the first ring surface 715 to fit the second ring surface 721 so that one only needs to select or test the maximum static friction force and kinetic friction force between the first ring surface 715 and the second ring surface 721 to meet the safety requirement. Accordingly, the brake lining 73 shall not be considered as a limitation of the present invention. However, if the brake lining 73 is utilized in decelerating the autorotation of the passive ring 72, it can certainly achieve a double buffering effect more easily.

What is claimed is:

1. An internal drum brake anti-falling device, comprising:
   a carrier, having an accommodating chamber defined therein;
   a rotating drum comprising a life belt coiled thereon;
   a main shaft, arranged across said accommodating chamber for supporting said rotating drum to autorotate;
   a brake unit, arranged at an end of said rotating drum; and
   a drum brake module, comprising a base detachably mounted in said accommodating chamber and a passive ring mounted on said base, wherein an outer diameter of said base defines a first ring surface configured in a concentric circle manner to said main shaft and an inner diameter of said passive ring defines a second ring surface, wherein the externally toothed ratchet teeth are arranged on the external surface of the passive ring opposite of the inner diameter of the passive ring defining the second ring surface to allow said second ring surface and said first ring surface to be disposed opposite to and closely fitting to each other so as to control said first ring surface and said second ring surface to sequentially generate maximum static friction force and kinetic friction force therebetween, when said life belt drives said brake unit buckling with said ratchet teeth to interact with an auto-rotation of said passive ring, thereby decelerating said passive ring, so as to buffer a falling speed of said life belt, wherein said base has a slit radially arranged thereon and comprises at least a check bolt crossing said slit, allowing said check bolt to rotate to adjust a width of said slit in order to change a diameter of said first ring surface for adjusting the maximum static friction force.

2. The internal drum brake anti-falling device, as recited in claim 1, wherein a circle-shaped gap is formed and maintained between said first ring surface and said second ring surface and a brake lining is fitted in said gap, so as to allow the auto-rotation of said passive ring to be decelerated through controlling a degree of cooperation between said gap and said brake pad.

3. The internal drum brake anti-falling device, as recited in claim 2, wherein said brake lining is affixed on said first ring surface.

4. The internal drum brake anti-falling device, as recited in claim 2, wherein said base has a slit radially arranged thereon and comprises at least a check bolt crossing said slit, allowing said check bolt to rotate to adjust a width of said slit in order to change the diameter of said first ring surface for adjusting a fitting precompression of the brake lining brought by the gap.

5. The internal drum brake anti-falling device, as recited in claim 4, wherein said base has a through hole axially penetrated therein and communicating with said slit.

6. The external drum brake anti-falling device, as recited in claim 4, wherein said brake lining is affixedly arranged on said first ring surface.

7. The external drum brake anti-falling device, as recited in claim 4, wherein said brake unit comprises a spring seat and an axle seat arranged on a periphery of an end of said rotating drum, wherein said axle seat comprises a centrifugal block pivotally connected therewith and a back spring mounted between said centrifugal block and said spring seat, so as to allow said back spring to drive said centrifugal block to have a constant outward positioning tendency, while said life belt drives said rotating drum to rotate in a certain speed, to allow said centrifugal block to overcome said back spring and be engaged with said ratchet teeth.

8. The external drum brake anti-falling device, as recited in in claim 4, wherein said carrier has a second hole arranged therein penetrating said accommodating chamber, wherein said base has a sixth hole matching said second hole, so as to allow a screw to pass through said second hole and be locked at said sixth hole, allowing said base to be detachably mounted in said accommodating chamber.

9. The external drum brake anti-falling device, as recited in claim 4, wherein said rotating drum has a left end and a right end oppositely arranged and an axle hole penetratingly provided at a circle center position for said main shaft to pass through, wherein said right end has an annular protruding lip axially protruded along a periphery of said axle hole, wherein said annular protruding lip has an assembling groove arranged radially therealong so as to allow an inner end of a turbination spring to mount therewith, wherein said turbination spring further has an outer end positioned on one end of said carrier in order to constantly provide a rollback force for said rotating drum to position.

10. The external drum brake anti-falling device, as recited in claim 2, wherein said brake unit comprises a spring seat and an axle seat arranged on a periphery of an end of said rotating drum, wherein said axle seat comprises a centrifugal block pivotally connected therewith and a back spring mounted between said centrifugal block and said spring seat, so as to allow said back spring to drive said centrifugal block to have a constant outward positioning tendency, while said life belt drives said rotating drum to rotate in a certain speed, to allow said centrifugal block to overcome said back spring and be engaged with said ratchet teeth.

11. The external drum brake anti-falling device, as recited in in claim 2, wherein said carrier has a second hole arranged therein penetrating said accommodating chamber, wherein said base has a sixth hole matching said second hole, so as to allow a screw to pass through said second hole and be locked at said sixth hole, allowing said base to be detachably mounted in said accommodating chamber.

12. The external drum brake anti-falling device, as recited in claim 2, wherein said rotating drum has a left end and a right end oppositely arranged and an axle hole penetratingly provided at a circle center position for said main shaft to pass through, wherein said right end has an annular protruding lip axially protruded along a periphery of said axle hole, wherein said annular protruding lip has an assembling groove arranged radially therealong so as to allow an inner end of a turbination spring to mount therewith, wherein said turbination spring further has an outer end positioned on one end of said carrier in order to constantly provide a rollback force for said rotating drum to position.

13. The external drum brake anti-falling device, as recited in claim 1, wherein said brake unit comprises a spring seat and an axle seat arranged on a periphery of an end of said rotating drum, wherein said axle seat comprises a centrifugal block pivotally connected therewith and a back spring mounted between said centrifugal block and said spring seat, so as to allow said back spring to drive said centrifugal block to have a constant outward positioning tendency, while said life belt drives said rotating drum to rotate in a certain speed, to allow said centrifugal block to overcome said back spring and be engaged with said ratchet teeth.

14. The external drum brake anti-falling device, as recited in claim 1, wherein said brake unit comprises a spring seat and an axle seat arranged on a periphery of an end of said rotating drum, wherein said axle seat comprises a centrifugal block pivotally connected therewith and a back spring mounted between said centrifugal block and said spring seat, so as to allow said back spring to drive said centrifugal block to have a constant outward positioning tendency, while said life belt drives said rotating drum to rotate in a certain speed, to allow said centrifugal block to overcome said back spring and be engaged with said ratchet teeth.

15. The external drum brake anti-falling device, as recited in in claim 1, wherein said carrier has a second hole arranged therein penetrating said accommodating chamber, wherein said base has a sixth hole matching said second hole, so as to allow a screw to pass through said second hole and be locked at said sixth hole, allowing said base to be detachably mounted in said accommodating chamber.

16. The external drum brake anti-falling device, as recited in claim 1, wherein said carrier has a second hole arranged therein penetrating said accommodating chamber, wherein said base has a sixth hole matching said second hole, so as to allow a screw to pass through said second hole and be locked at said sixth hole, allowing said base to be detachably mounted in said accommodating chamber.

17. The external drum brake anti-falling device, as recited in claim 1, wherein said rotating drum has a left end and a right end oppositely arranged and an axle hole penetratingly provided at a circle center position for said main shaft to pass through, wherein said right end has an annular protruding lip axially protruded along a periphery of said axle hole, wherein said annular protruding lip has an assembling groove arranged radially therealong so as to allow an inner end of a turbination spring to mount therewith, wherein said turbination spring further has an outer end positioned on one end of said carrier in order to constantly provide a rollback force for said rotating drum to position.

18. The external drum brake anti-falling device, as recited in claim 1, wherein said rotating drum has a left end and a right end oppositely arranged and an axle hole penetratingly provided at a circle center position for said main shaft to pass through, wherein said right end has an annular protruding lip axially protruded along a periphery of said axle hole, wherein said annular protruding lip has an assembling groove arranged radially therealong so as to allow an inner end of a turbination spring to mount therewith, wherein said turbination spring further has an outer end positioned on one end of said carrier in order to constantly provide a rollback force for said rotating drum to position.

\* \* \* \* \*